(12) United States Patent
Hiltner et al.

(10) Patent No.: US 6,739,289 B2
(45) Date of Patent: May 25, 2004

(54) METHOD AND APPARATUS FOR PROVIDING A HYDROGEN ENRICHED FUEL TO COMBUSTION PRECHAMBER

(75) Inventors: Joel D. Hiltner, Powell, OH (US); Martin L. Willi, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/133,879

(22) Filed: Apr. 26, 2002

(65) Prior Publication Data

US 2003/0200939 A1 Oct. 30, 2003

(51) Int. Cl.$^7$ ................................................. F02B 43/08
(52) U.S. Cl. ............................. 123/3; 123/253; 123/277
(58) Field of Search ............................ 123/3, DIG. 12, 123/527, 253, 277

(56) References Cited

U.S. PATENT DOCUMENTS

| 3,970,054 A | | 7/1976 | Henault et al. |
| 4,140,090 A | | 2/1979 | Lindberg |
| 4,223,645 A | * | 9/1980 | Nohira et al. ............... 123/292 |
| 4,638,777 A | | 1/1987 | Fanner et al. |
| 4,965,052 A | * | 10/1990 | Lowther et al. ............... 123/3 |
| 5,081,969 A | | 1/1992 | Long, III |
| 5,090,967 A | | 2/1992 | Lindstrom |
| 5,139,002 A | * | 8/1992 | Lynch et al. ......... 123/DIG. 12 |
| 5,154,142 A | | 10/1992 | Kamo |
| 5,611,307 A | | 3/1997 | Watson |
| 5,666,923 A | | 9/1997 | Collier, Jr. et al. |
| 6,016,785 A | | 1/2000 | Divecha et al. |
| 6,033,793 A | | 3/2000 | Woods et al. |
| 6,079,373 A | * | 6/2000 | Kawamura ..................... 123/3 |

FOREIGN PATENT DOCUMENTS

| JP | 52/59216 | | 5/1977 |
| JP | 352059216 A | * | 5/1977 |
| JP | 61171870 A | * | 8/1986 |

* cited by examiner

Primary Examiner—Noah P. Kamen
(74) Attorney, Agent, or Firm—Steve D Lundquist

(57) ABSTRACT

A method and apparatus for providing a hydrogen enriched fuel to a combustion prechamber. The method and apparatus includes reforming a quantity of fuel to produce a hydrogen enriched fuel, delivering the reformed fuel to the combustion prechamber, and combining the hydrogen enriched fuel with a fuel/air mixture to less than stoichiometric.

8 Claims, 4 Drawing Sheets

Fig_1.

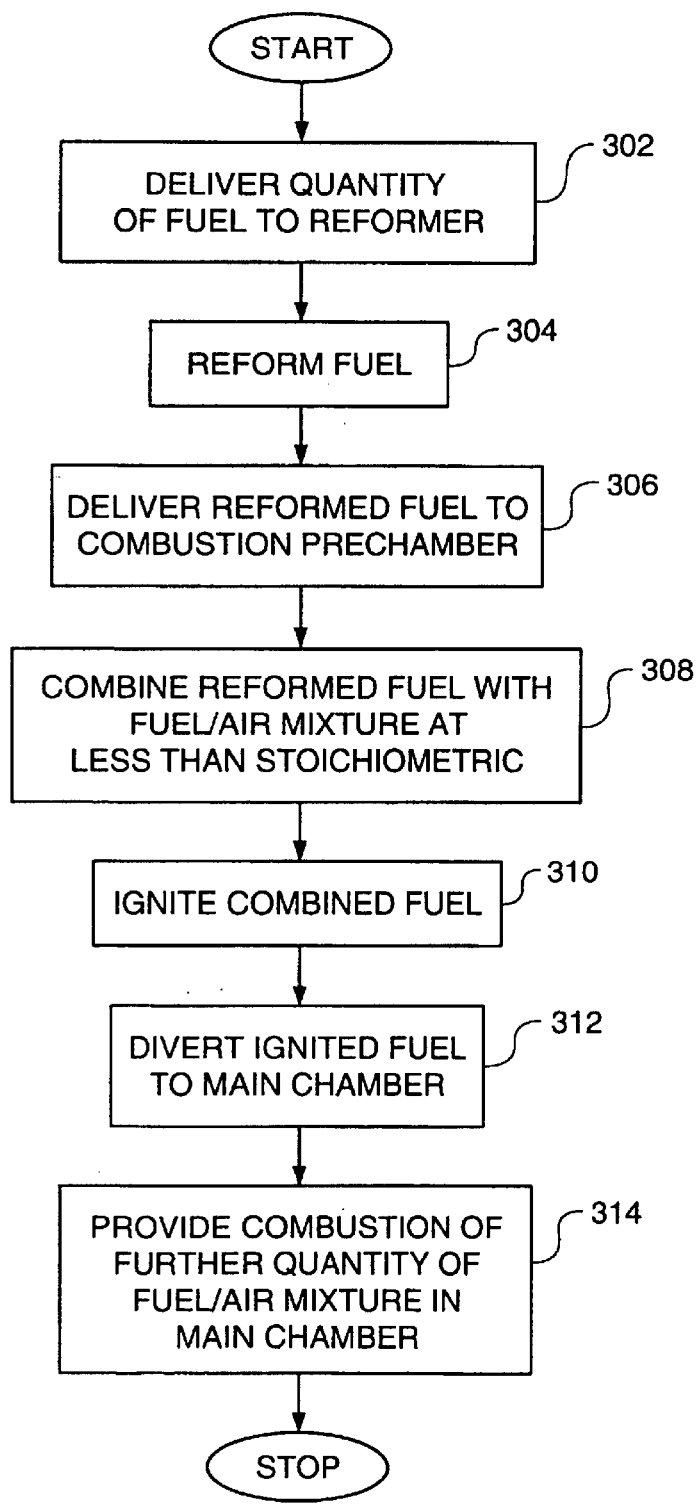

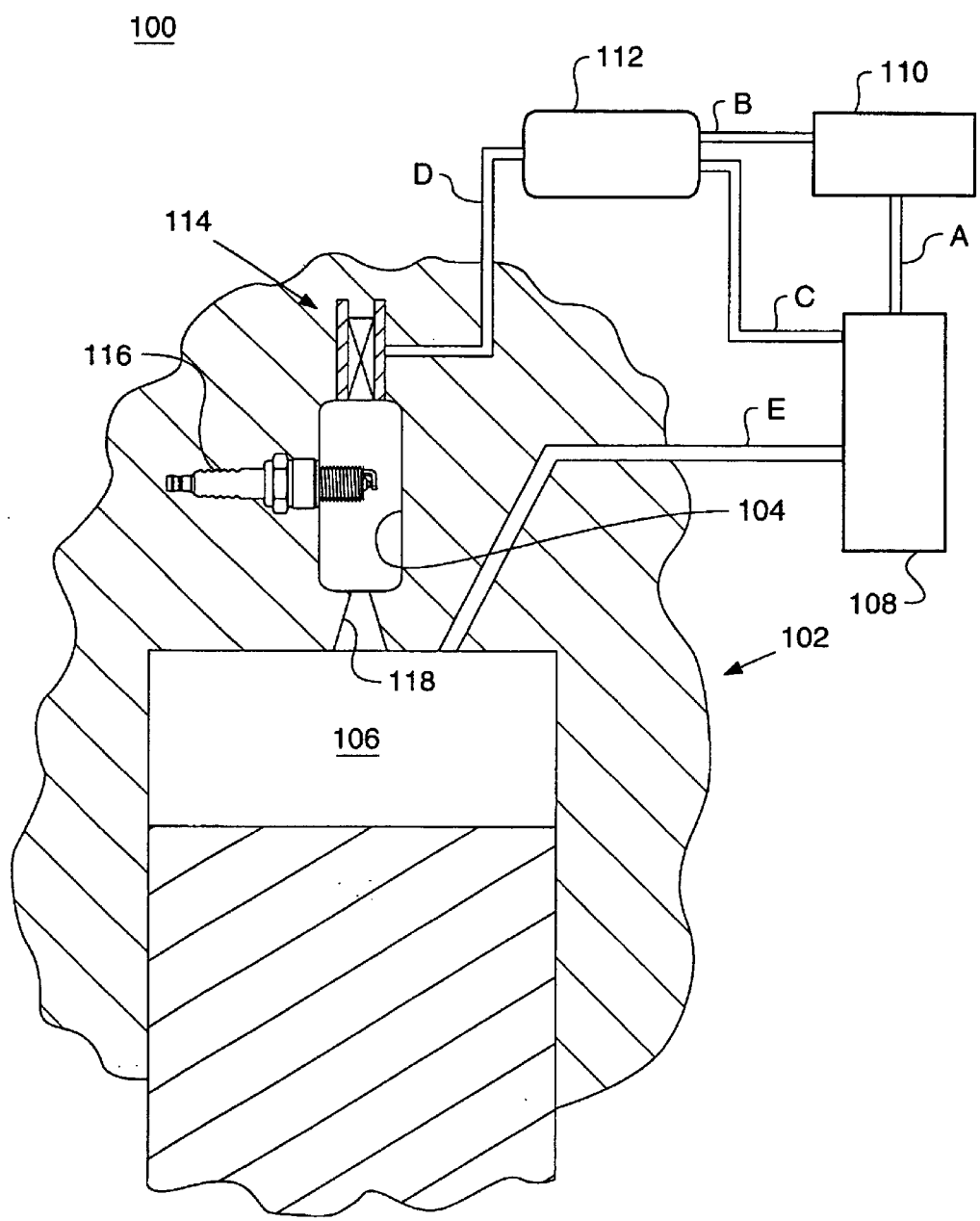

METHOD AND APPARATUS FOR PROVIDING A HYDROGEN ENRICHED FUEL TO COMBUSTION PRECHAMBER

TECHNICAL FIELD

This invention relates generally to a method and apparatus for providing fuel to a combustion prechamber and, more particularly, to a method and apparatus for providing a hydrogen enriched reformed fuel to a combustion prechamber.

BACKGROUND

Internal combustion engines are typically configured to introduce an amount of fuel of some type into a main combustion chamber, in which the fuel is ignited to provide power to operate the engine. Various kinds of fuel are used with varying degrees of ignition and combustion properties. One example of fuel is natural gas, which has a high octane number and thus provides a substantial resistance to engine knock. However, when natural gas is introduced as a lean mixture, i.e., mixed with oxygen, for the purpose of reducing noxious emissions, the lean natural gas mixture does not ignite as well as desired.

A common method for overcoming the problem of poor ignition of lean fuel mixtures is to deliver a small amount of a rich mixture of fuel into a combustion prechamber. The fuel in the prechamber is then ignited and the resultant combustion flame is diverted into the main chamber to ignite the leaner fuel mixture in the main chamber.

It has also been found that a hydrogen enriched fuel, for example a reformed fuel, introduced into the prechamber provides for increased ignition properties in the prechamber. For example, in U.S. Pat. No. 5,611,307, Watson discloses a system which introduces hydrogen into a prechamber, either directly or by way of reformed fuel. The rich hydrogen mixture, which has an equivalence ratio in the range of 1.2 to 7 times stoichiometric, is then ignited. The resultant flame is diverted into the main chamber for combustion of the primary fuel.

Although the rich hydrogen prechamber mixture disclosed by Watson may increase combustion efficiency in the main chamber, the rich mixture results in highly increased temperatures within the prechamber. For example, the temperature at a prechamber tip, i.e., the portion of the prechamber allowing entrance of the flame into the main chamber, may be about 900 degrees Celsius. These increased temperatures limit the maximum load of the engine and lead to shortened component life. It would be desirable to provide a readily ignitable fuel mixture in the combustion prechamber and maintain reduced temperatures during the ignition process.

The present invention is directed to overcoming one or more of the problems as set forth above.

SUMMARY OF THE INVENTION

In one aspect of the present invention a method for providing a hydrogen enriched fuel to a combustion prechamber is disclosed. The method includes reforming a quantity of fuel to produce a hydrogen enriched fuel, delivering the reformed fuel to the combustion prechamber, and combining the hydrogen enriched fuel with a fuel/air mixture to less than stoichiometric.

In another aspect of the present invention a method for providing a reduced temperature ignition in a combustion prechamber is disclosed. The method includes reforming a quantity of fuel to produce a hydrogen enriched fuel, delivering the reformed fuel to the combustion prechamber, delivering a portion of fuel/air mixture from a main combustion chamber to the combustion prechamber, the reformed fuel and the fuel/air mixture combining to less than stoichiometric, and igniting the combined fuel in the combustion prechamber, the less than stoichiometric fuel providing a reduced temperature ignition.

In yet another aspect of the present invention an apparatus for providing a hydrogen enriched fuel to a combustion prechamber is disclosed. The apparatus includes a fuel supply and a fuel reformer for receiving a quantity of fuel from the fuel supply and producing a hydrogen enriched fuel, wherein the hydrogen enriched fuel is combined with a fuel/air mixture in the combustion prechamber at less than stoichiometric.

BRIEF DESCRIPTION OF THE DRAWINGS

FIG. 3 is a flow diagram illustrating a preferred method of the present invention; and FIG. 4 is a diagrammatic illustration of an alternate embodiment of the present invention.

DETAILED DESCRIPTION

Figure 1:
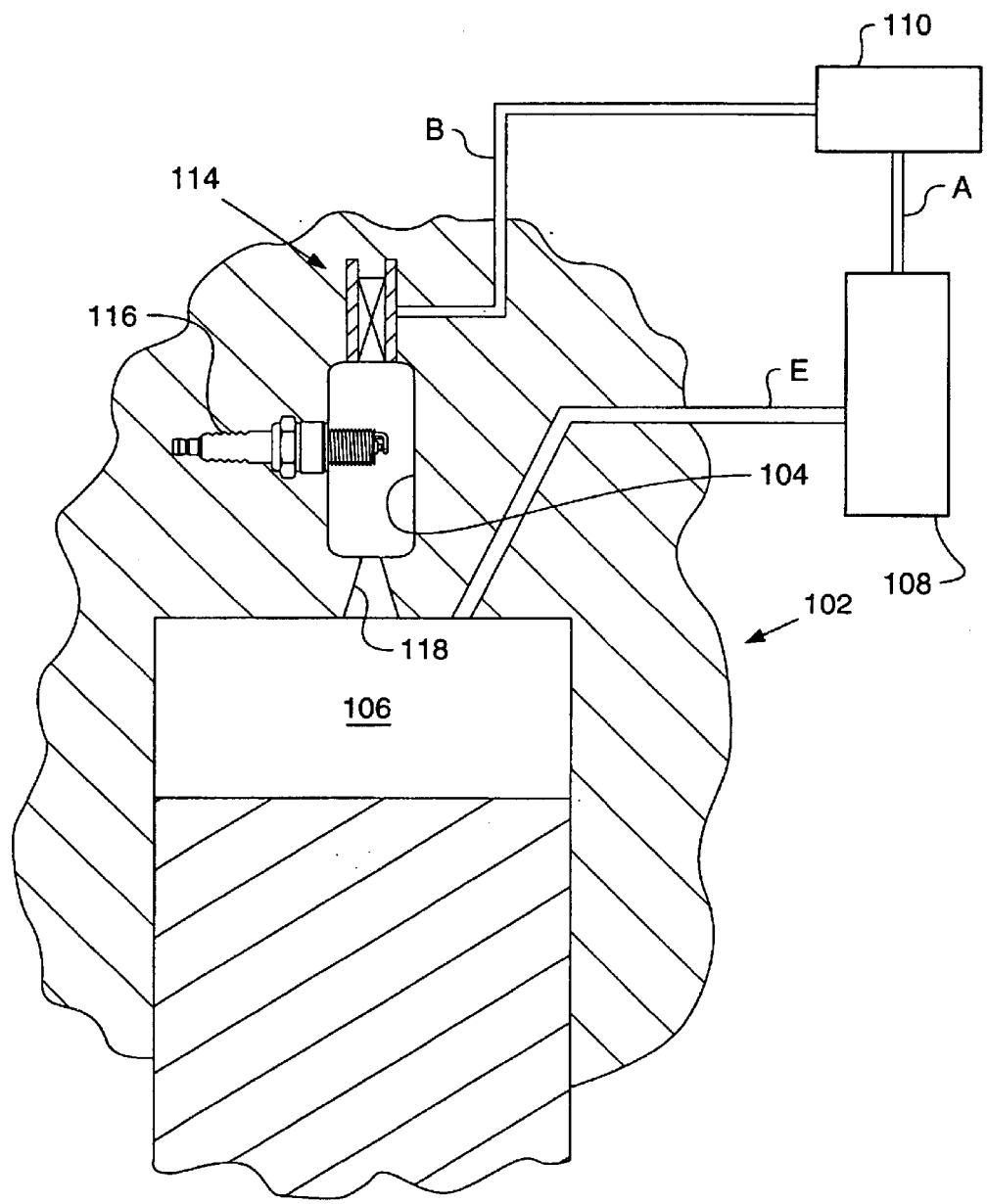
FIG. 1 is a diagrammatic illustration of a preferred embodiment of the present invention.

Referring to the drawings and the accompanying claims, a method and apparatus 100 for providing a hydrogen enriched fuel to a combustion prechamber 104 is disclosed.

FIG. 1 depicts a portion of an engine 102. The engine 102 is an internal combustion engine which uses a combustible fuel to produce power. An exemplary fuel includes natural gas. However, other types of fuel, e.g., landfill gas, digester gas, and the like, may be used as well. In typical operation, fuel is delivered to a main combustion chamber 106, in which combustion takes place. Under certain operating conditions, however, full and complete combustion is difficult to achieve.

A technique used to assist in combustion in the main combustion chamber 106 is to ignite a small quantity of fuel in the combustion prechamber 104, and deliver the ignited fuel to the main combustion chamber 106. The ignited fuel creates combustion of the fuel in the main combustion chamber 106. In the preferred embodiment, the fuel in the combustion prechamber 104 is ignited by means of an ignition device 116, such as a spark plug. The ignited fuel is then delivered to the main combustion chamber 106 through a flame communication passageway 118.

A fuel supply 108 provides fuel to both the combustion prechamber 104 and the main combustion chamber 106. Alternatively, more than one fuel supply may be used. Furthermore, the fuel to the combustion prechamber 104 and the main combustion chamber 106 may be of the same type of fuel or may be different fuels, as desired.

Fuel is delivered from the fuel supply 108 to a fuel reformer 110 via fuel passageway A. The fuel reformer 110 operates to reform the fuel to produce hydrogen enriched fuel. Reforming of fuel is well known in the art and may be accomplished by such techniques as partial oxidation, steam reforming, and the like.

The reformed fuel is then delivered, via fuel passageway B and through a combustion isolation check valve 114, to the combustion prechamber 104.

In an alternate embodiment, as shown in FIG. 4, fuel is also delivered, via fuel passageway C, from the fuel supply 108 to means 112 for combining, to be combined with the hydrogen enriched fuel, which is also delivered, via fuel passageway B, to the means 112 for combining. Preferably, the fuel is combined with the hydrogen enriched fuel as a ratio of 80% hydrogen enriched fuel to 20% fuel, although other ratios could be used as well. The combined fuel is then delivered, via fuel passageway D, to the combustion prechamber 104.

Additional fuel is delivered, via fuel passageway E, from the fuel supply 108 to the main combustion chamber 106. Combustion of the fuel in the main combustion chamber 106 takes place when the ignited combined fuel from the combustion prechamber 104 enters the main combustion chamber 106 by way of the flame communication passageway 118.

In the preferred embodiment, the fuel delivered to the combustion prechamber 104 is about 5% of the total fuel used, and the fuel delivered to the main combustion chamber 106 accounts for the remaining 95%. The small quantity of fuel delivered to the combustion prechamber 104 is combined with a small quantity of fuel/air mixture from the main combustion chamber 106 to produce a lean mixture, i.e., less than stoichiometric. However, the addition of the hydrogen enriched fuel provides the combined fuel with ignition properties which compare with rich fuel mixtures in efficiency and effectiveness. Preferably, the remaining fuel/air mixture in the main combustion chamber 106 is also lean, thus offering the advantages of burning a lean mixture of fuel.

Figure 2:
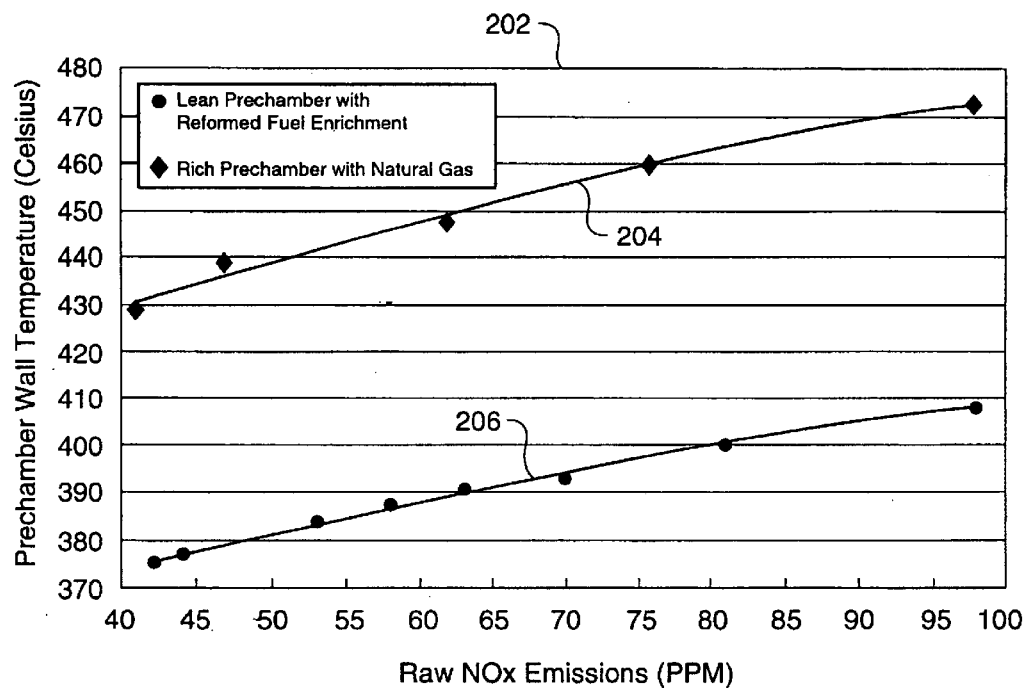
FIG. 2 is a graph illustrating exemplary benefits from use of the present invention.

FIG. 2 is a graph 202 which illustrates the temperature difference in the combustion prechamber 104 when hydrogen enriched fuel is combined with the fuel as compared to the temperature when fuel alone is used. A comparison of a plot 204 of a rich prechamber with natural gas alone with a plot 206 of a lean prechamber with reformed fuel enrichment indicates about a 60 to 70 degree Celsius reduction in temperature when hydrogen enriched fuel is added to a lean fuel mixture. However, it is noted that the temperature near the flame communication passageway, commonly known as the prechamber tip, may be about 900 degrees Celsius. The use of a lean prechamber with reformed fuel enrichment is found to reduce this temperature by as much as several hundred degrees.

Referring to FIG. 3, a flow diagram illustrating a preferred method for providing a hydrogen enriched fuel to a combustion prechamber 104 is shown.

In a first control block 302, a quantity of fuel is delivered to the fuel reformer 110. Control proceeds to a second control block 304, in which the first quantity of fuel is reformed to produce hydrogen enriched fuel.

In a third control block 306, the reformed fuel is delivered to the combustion prechamber 104. In a fourth control block 308, the reformed fuel is combined with a small quantity of the fuel/air mixture from the main combustion chamber at less than stoichiometric. It is well known in the art that stoichiometric has an equivalence ratio of 1.0, i.e., the mixture has just enough air to burn all of the fuel. Equivalence ratios greater than 1.0 are classified as rich mixtures, and ratios less than 1.0 are considered to be lean. In the preferred embodiment, it is desired that the combined fuel has an equivalence ratio of about 0.5 to 0.7.

The combined fuel is then ignited, as shown by a fifth control block 310. In a sixth control block 312, the ignited fuel, i.e., the flame from igniting the combined fuel, is diverted to the main combustion chamber 106 by way of the flame communication passageway 118. The ignited fuel in turn provides combustion of the remaining quantity of fuel/air mixture in the main combustion chamber 106.

Industrial Applicability

As an example of application of the present invention, it is desired to burn lean fuel in the main combustion chamber 106 to achieve more complete combustion and thus reduce the emissions of noxious gases and particles. However, it is difficult to ignite lean fuel mixtures directly, in particular fuels such as natural gas. One method to overcome this is to ignite a small quantity of fuel in the combustion prechamber 104 and use the ignited fuel to cause combustion in the main combustion chamber 106. The prechamber fuel traditionally is a rich mixture, thus facilitating combustion in the combustion prechamber 104.

The rich fuel mixture, however, causes high temperatures to develop within the combustion prechamber 104. The high temperatures, which may be about 900 degrees Celsius at the portion of the combustion prechamber 104 near the flame communication passageway 118, i.e., the prechamber tip, limit the maximum load of the engine 102 and result in shortened component life. The present invention, providing a hydrogen enriched fuel to the combustion prechamber 104, reduces the temperature by as much as several hundred degrees Celsius, thus alleviating problems caused by high temperatures.

Other aspects, objects, and features of the present invention can be obtained from a study of the drawings, the disclosure, and the appended claims.

What is claimed is:

1. A method for providing a hydrogen enriched fuel to a combustion prechamber, including the steps of:

reforming a quantity of fuel to produce a hydrogen enriched fuel;

combining the reformed fuel with a further quantity of fuel;

delivering the combined reformed fuel and further quantity of fuel to the combustion prechamber; and combining the hydrogen enriched fuel with a fuel/air mixture in the combustion prechamber to less than stoichiometric.

2. A method, as set forth in claim 1, further including the steps of:

igniting the combined fuel in the combustion prechamber;

diverting the ignited fuel to a main combustion chamber; and providing combustion of a quantity of fuel in the main combustion chamber.

3. A method, as set forth in claim 1, wherein less than stoichiometric includes an equivalence ratio less than 1.0.

4. A method, as set forth in claim 3, wherein less than stoichiometric includes an equivalence ratio in the range of about 0.5 to 0.7.

5. A method, as set forth in claim 1, wherein the fuel is natural gas.

6. A method for providing a reduced temperature ignition in a combustion prechamber, including the steps of:

reforming a quantity of fuel to produce a hydrogen enriched fuel;

combining the reformed fuel with a further quantity of fuel;

delivering the combined reformed fuel to the combustion prechamber;

delivering a portion of fuel/air mixture from a main combustion chamber to the combustion prechamber, the reformed fuel and the fuel/air mixture combining to less than stoichiometric; and igniting the combined fuel in the combustion prechamber, the less than stoichiometric fuel providing a reduced temperature ignition.

7. An apparatus for providing a hydrogen enriched fuel to an internal combustion engine, comprising:

a fuel supply;

a fuel reformer for receiving a quantity of fuel from the fuel supply and producing a hydrogen enriched fuel;

a combiner for combining the hydrogen enriched fuel with a further quantity of fuel; and a combustion prechamber for receiving the combined hydrogen enriched fuel and for receiving a portion of fuel/air mixture from a main combustion chamber.

8. An apparatus, as set forth in claim 7, further including:

an ignition device located in the combustion prechamber; and a flame communication passageway from the combustion prechamber to the main combustion chamber for allowing passage of the combined fuel, ignited by the ignition device, from the combustion prechamber to the main combustion chamber.

* * * * *